(12) United States Patent
Kantorowitz et al.

(10) Patent No.: US 8,332,830 B2
(45) Date of Patent: Dec. 11, 2012

(54) ENVIRONMENT-INDEPENDENT SOFTWARE

(75) Inventors: Ellezer Kantorowitz, Haifa (IL); Alexander Lyakas, Haifa (IL)

(73) Assignee: Eliezer Kantorowitz, Haifa (IL)

( * ) Notice: Subject to any disclaimer, the term of this patent is extended or adjusted under 35 U.S.C. 154(b) by 1127 days.

(21) Appl. No.: 11/883,514

(22) PCT Filed: Feb. 7, 2006

(86) PCT No.: PCT/IL2006/000150
§ 371 (c)(1),
(2), (4) Date: Aug. 1, 2007

(87) PCT Pub. No.: WO2006/085305
PCT Pub. Date: Aug. 17, 2006

(65) Prior Publication Data
US 2008/0141231 A1    Jun. 12, 2008

Related U.S. Application Data

(60) Provisional application No. 60/650,517, filed on Feb. 8, 2005.

(51) Int. Cl.
*G06F 9/45* (2006.01)
(52) U.S. Cl. .................. 717/148; 717/146; 717/147
(58) Field of Classification Search .................. 717/147
See application file for complete search history.

(56) References Cited

U.S. PATENT DOCUMENTS

| | | | | |
|---|---|---|---|---|
| 5,067,072 A * | 11/1991 | Talati et al. | ................... | 717/148 |
| 6,301,704 B1 * | 10/2001 | Chow et al. | ................... | 717/146 |
| 6,865,733 B2 * | 3/2005 | Broussard | ..................... | 717/147 |
| 6,889,118 B2 * | 5/2005 | Murray, IV et al. | .......... | 700/250 |
| 7,082,600 B1 * | 7/2006 | Rau et al. | ..................... | 717/148 |
| 7,409,682 B2 * | 8/2008 | Gazda et al. | ................... | 717/147 |
| 2004/0163046 A1 * | 8/2004 | Chu et al. | ....................... | 715/517 |
| 2005/0289527 A1 * | 12/2005 | Illowsky et al. | .............. | 717/148 |
| 2006/0101436 A1 * | 5/2006 | Anderson et al. | ............. | 717/141 |
| 2006/0101439 A1 * | 5/2006 | Massarenti et al. | ........... | 717/148 |
| 2006/0130072 A1 * | 6/2006 | Rhoten et al. | .................. | 719/321 |

OTHER PUBLICATIONS

Matt Curtin, "Write Once, Run Anywhere: Why It Matters", JavaSoft Jan. 1997, 5 pages, <http://www.interhack.net/people/cmcurtin/rants/write-once-run-anywhere/write-once-run-anywhere.pdf>.*

(Continued)

*Primary Examiner* — Thuy Dao
*Assistant Examiner* — Cuong V Luu
(74) *Attorney, Agent, or Firm* — Holtz, Holtz, Goodman & Chick, PC (57) ABSTRACT

A method for communicating between at least one environment-independent application logic code (AL code) and at least one environment which is a combination of hardware and software. The method includes creating at least one interaction style code (IS code) that is specific to and communicates with the at least one environment, and is provided with an interaction style interface (IS interface) for interfacing an interaction style with said at least one application logic code (AL code). The interaction style interface (IS interface) is independent of and does not specify properties of said at least one environment, and the at least one environment-independent application logic code (AL code) runs unchanged in all environments. The at least one interaction style code (IS code) is operable with all of a graphical user interface, a non-graphical user interface, an HTML-based web browser user interface, and no user interface.

15 Claims, 5 Drawing Sheets

OTHER PUBLICATIONS

H. Abdel-Wahab, "Java-based Multimedia Collaboration and Application Sharing Environment", 1999 Citeseer, 14 pages, <http://citeseerx.ist.psu.edu/viewdoc/>.*

Douglas Kramer, "The Java Platform", May 1996 Java Soft, 25 pages, <http://www.math.vu.nl/~eliens/online/#share/documents/java/white/JavaPlatform.pdf>.*

Kleanthis Thramboulidis, "Real-Time Java in Control and Automation: A Model Driven Development Approach", 2005 IEEE, pp. 39-46, <http://ieeexplore.ieee.org/stamp/stamp.jsp?tp=&arnumber=1612500>.*

Fabio Paternò, "Models for Universal Usability", 2003 ACM, pp. 9-16, <http://dl.acm.org/citation.cfm?id=1063669>.*

Tomonori Usaka, "A Design and Evaluation of the Multi-User Virtual Environment Server System for the Digital Museum", 1996 IEEE, pp. 60-69, <http://ieeexplore.ieee.org/stamp/stamp.jsp?tp=&arnumber=566190>.*

Extended European Search Report dated Oct. 10, 2008 (6 pages), issued in counterpart European Application Serial No. 06704672.2.

Kantorowitz et al., "A specification-oriented framework for information system user interfaces", Advances in Object-Oriented Information Systems, OOIS 2002 Workshops (Lecture notes in Computer Science vol. 2426), 2002, pp. 112-121, Berlin, Germany.

Raggett et al., "HTML 4.0 Specification, Ch. 17, Forms", [Online], Retrieved from the Internet: URL: <http://www.w3.org/TR/1998/REC-html40-19980424/html40.pdf> [retreived Nov. 22, 2004], p. 230.

Kantorowitz et al., "Use-case components for interactive information systems", Science of Computer Programming, Elsevier Science Publishers BV., vol. 56, No. 1-2, pp. 5-21, Apr. 1, 2005, Amsterdam, NL.

* cited by examiner

```
1 Select.one("action",
            DB.read("SELECT name AS \"Action\" FROM action_type"),
            null, null, null, "Select your desired action:");
2 Select.one("account",
            DB.read("SELECT A.id AS \"Account Number\", A.description, " +
                    "A.balance, A.credit_line AS \"Credit Line\" " +
                    "FROM account A, customer_account_rel CA " +
                    "WHERE A.id=CA.account_id AND CA.customer_id=" +
                    UserID.getUsername()),
            null, "Account Number", null, "Select the desired account:");
3 UserComposed.any("amount", null, "Specify the desired amount:");
4 Action.action("performAction", "OK");
```

| Select your desired action: | Select your desired action: |
|---|---|
| Withdraw ▼ | Withdraw ▼ |
| Select the desired account: | Withdraw |
| 5005 High Balance 3300.00 ▼ | Deposit ccount: |
| | Deposit to Savings Account |
| | 5005 High Balance 3300.00 ▼ |
| Specify the desired amount: | Specify the desired amount: |
| Mandatory | Mandatory |
| OK | OK |

Figure 4          Figure 5

| Select your desired action: | Select your desired action: |
|---|---|
| Withdraw ▼ | Withdraw ▼ |
| Select the desired account: | Select the desired account: |
| 5006 Checking Account 2458.32 ▼ | 5006 Checking Account 2458.32 ▼ |
| 5005 High Balance 3300.00 | |
| 5006 Checking Account 2458.32 | Specify the desired amount: |
| 5007 Visa -29.97 5000.00 | 450 |
| 5008 Super Interest Account 59851.35 | |
| OK | OK |

Figure 6          Figure 7

Select your desired action:
[Withdraw ▼]

Select the desired account:
[5006  Checking Account  2458.32 ▼]

Specify the desired amount:
[450]

Select your desired action:
| Withdraw |
| Deposit |
| Deposit to Savings Account |

Select the desired account:

| ○ | ◉ | ○ | ○ |
|---|---|---|---|
| Account Number:5005 DESCRIPTION:High Balance BALANCE:3300.00 Credit Line: | Account Number:5006 DESCRIPTION:Checking Account BALANCE:2458.32 Credit Line: | Account Number:5007 DESCRIPTION:Visa BALANCE:-29.97 Credit Line:5000.00 | Account Number:5008 DESCRIPTION:Super Interest Account BALANCE:59851.35 Credit Line: |

Specify the desired amount:
[450]

| Select your desired action: | | | |
|---|---|---|---|
| Action | | | |
| ⦿ Withdraw | | | |
| ○ Deposit | | | |
| ○ Deposit to Savings Account | | | |

Select the desired account:

| Account Number | DESCRIPTION | BALANCE ↓ | Credit Line |
|---|---|---|---|
| ○ 5007 | Visa | -29.97 | 5000.00 |
| ⦿ 5006 | Checking Account | 2458.32 | |
| ○ 5005 | High Balance | 3300.00 | |
| ○ 5008 | Super Interest Account | 59851.35 | |

Specify the desired amount:
450

ENVIRONMENT-INDEPENDENT SOFTWARE

CROSS-REFERENCE TO RELATED APPLICATIONS

This application is a National Phase Application of PCT International Application No. PCT/IL2006/000150, entitled "Environment-Independent Software", International Filing Date Feb. 7, 2006, published on Aug. 17, 2006 as International Publication No. WO 2006/085305, which in turn claims priority from U.S. Provisional Patent Application No. 60/650,517, filed Feb. 8, 2005, both of which are incorporated herein by reference in their entirety.

FIELD OF THE INVENTION

The present invention relates to software. More particularly it relates to a method for facilitating environment-independent application logic codes to successfully communicate with hardware components.

BACKGROUND OF THE INVENTION

Figure 2:
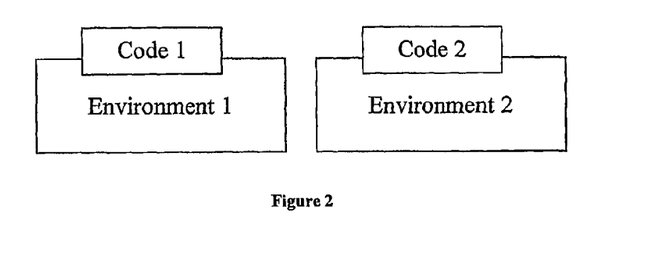
FIG. 2 illustrates the prior art approach to developing an environment independent software.

It is sometimes required to run the same computer application in different environments. Consider, for example, a program for statistical analysis that has to run on both a PC, managed by the Microsoft Windows operating system, and on a SUN workstation managed by SUN's SOLARIS operating system. The usual solution is to develop two different codes that fit to the two different environments, as illustrated on FIG. 2. Later, when new versions of the operating systems are introduced, further code versions of the application must be developed for the new operating system versions. There may, for example, be different code versions for different MS-Windows versions, such as Windows 98 and Windows XP. The number of different application versions has thus a tendency to grow. Consider the case, in which some errors have been detected in the code of the application. In this case, the code of each one of the different application versions must be corrected separately. Similarly, when there is a need to extend the application with some new functionality, the extensions must be introduced separately in each one of the different code versions. The development and later maintenance of an application that has to run in a number of different environments is, therefore, labor-intensive. One of the purposes of the present invention is to reduce the effort, required for developing and maintaining the code of an application that has to run in different environments. One of the goals of the present invention is that each application should be implemented by a single code that runs without any changes in all the different environments. Any detected bug need only to be corrected in one place it is in this single code. A further goal of the invention is to reduce the development and maintenance costs of the interface between the application and the operating environment including possible Graphical User Interfaces (GUI).

The current industrial practice in developing applications that have to operate in different environments, is to write the code in a programming language, for which compilers exist in all the targeted environments. The code needed in the different environments may, however, be different. This happens when the different environments employ different methods of interaction with the application. The different environments may for example employ different operating systems and different drivers for special hardware. The code of the application must in these cases be adapted to each one of these different environments. These adaptation efforts may be labor-intensive. These adaptation efforts may, however, be avoided by employing a modern cross-platform programming language like Java, which provides some of the operating system services. This enables to code the entire application, including the GUI (Graphical User Interface), to be written in the same language and run it in all the environments, in which the language operates. This ability of having the same code run in many different environments is sometimes denoted as "writing once and running everywhere". This meets our goal of having only one single code to write and maintain.

There are, however, situations, in which the Java codes required for two different environments are still quite different. This may happen when there are differences in the employed hardware. One example is the code of the GUI employed on a large PC screen and the GUI code employed on a small screen of a cellular phone. The GUI employed on the PC may be large and, therefore, not fit in the small screen of the phone. A different, space-saving GUI must, therefore, be coded for the phone. For these kinds of situations further labor-saving methods have been developed. We shall now discuss these techniques.

We discuss first the technology that appears closest to our invention and which is described in the papers by J. Grundy, W. Zou and B. Yang (Grundy, J. C. and Zou, W.: An architecture for building multi-device thin-client web user interfaces. In Proceedings of the 14th Conference on Advanced Information Systems Engineering, Toronto, Canada, May 29-31 2002, Lecture Notes in Computer Science 2348). This method is concerned with adapting the user interface (UI) of a given Web application to different Web-enabled devices. In this method, the various pages of a Web application are specified using a set of custom Java Server Pages (JSP) tags. At runtime, the code of these JSP tags generates a UI adapted to the concrete device. The adaptation performed is the rearrangement of the structure and layout of the UI in order to fit to the device's presentational facilities, such as screen size. This work, however, does not consider such adaptations as selecting the UI controls that are most appropriate for the device, e.g., employing a drop-down menu instead of a set of radio buttons. The selection of the employed UI controls is performed by the developer, when she designs the application pages. This is illustrated by FIG. 5 in the paper by Grundy et al., which shows the authors' development environment. If it is, for example, required to run the application on both a small- and a large-screen device, the developer may select a space-saving drop-down menu for the small screen and large legible radio buttons for the large screen. There will, in other words, be two different versions of the JSP code for the two different devices.

This contrasts with our "one code version" goal.

We discuss now XWeb technology, presented in a paper by Olsen, D. R. Jr., Jefferies, S., Nielsen, T., Moyes, W., Fredrickson, P.: Cross-modal interaction using XWeb. UIST 2000 San Diego, Calif. (USA), 5-8 Nov. 2000. This approach provides tools for constructing both service-providing XWeb servers and corresponding XWeb clients. The data that an XWeb server can provide to XWeb clients are specified by Extensible Markup Language (XML) structures. Interactions are specified by special XML structures called XViews. For each application, the developer must specify its XViews. When moving the application to a platform with different characteristics it may be necessary to redesign the XView's to fit to the capabilities of the new platform. An application may therefore employ different XView codes on different platforms. This contrasts with our "one code version" goal.

We now discuss the approach elaborated by Mod G., Paterno' F., Santoro C.: CITE: Support for Developing and Analyzing Task Models for Interactive System Design. IEEE Transactions on Software Engineering, August 2002, pp. 797-813, and Mod G., Paterno' F., Santoro C.: Tool Support for Designing Nomadic Applications. Proceedings ACM IUI'03, Miami, pp. 141-148, ACM Press. The code of an application is structured in such a way, that the UI code may be relatively easily modified to fit to different platforms having different characteristics. In this approach, the UI code is a part of the code of the application. This means that we have different versions of the application code for different platforms. This contrasts with our "one code version" goal. Finally, we mention the paper by Gilroy, S. W., Harrison, M. D.: "Using Interaction Style to Match the Ubiquitous User Interface to the Device-to-Hand". The 9th IFIP Working Conference on Engineering for Human-Computer Interaction, Tremsbüttel Castle, Hamburg, Germany, July 11-13,2004. This method assumes that in order to run a given application program on different computing platforms having different characteristics, different kinds of UI interaction styles may be needed. The experimental system described in the paper employs the "form fill", the "dialogue style" and the "Menu style interaction style". When it is required to run a given application on a given platform, an XML specification of an appropriate interaction style must be written by the developer of the application. This XML specification specifies how the abstract components of a UI of this style relate to the data and computations of this particular program. If it is required to run the application on a different platform, where a different kind of interaction style is appropriate, a corresponding new XML specification must be written. The developer may thus have to write different XML specifications for the different environments. This contrasts with our "one code version" goal. Note that the "interaction style" term employed above is different from the "interaction style" term employed in the later description of our invention.

BRIEF DESCRIPTION OF THE PRESENT INVENTION

There is thus provided, in accordance with some preferred embodiments of the present invention, a method for allowing at least one environment-independent application logic code to successfully communicate with at least one hardware component, the method comprising:
creating an interaction style code that interfaces with said at least one hardware component, the interaction style code provided with an interaction style interface that is independent of properties of said at least one hardware component for interfacing the interaction style with said at least one application logic code.

Furthermore, in accordance with some preferred embodiments of the present invention, said at least one hardware component comprises a user interface device.

Furthermore, in accordance with some preferred embodiments of the present invention, the user interface device comprises keyboard and monitor.

Furthermore, in accordance with some preferred embodiments of the present invention, said at least one hardware component comprises a sensor.

Furthermore, in accordance with some preferred embodiments of the present invention, said at least one hardware component comprises a robotic device.

Furthermore, in accordance with some preferred embodiments of the present invention, said at least one hardware component comprises a personal digital assistant (PDA) device.

Furthermore, in accordance with some preferred embodiments of the present invention, said at least one hardware component comprises a personal computer (PC) device.

Furthermore, in accordance with some preferred embodiments of the present invention, the properties of said at least one hardware component comprise physical properties.

Furthermore, in accordance with some preferred embodiments of the present invention, the properties of said at least one hardware component comprise graphical properties.

Furthermore, in accordance with some preferred embodiments of the present invention, the interaction style interface specifies input and output data.

Furthermore, in accordance with some preferred embodiments of the present invention, the interaction style interface specifies input and output messages.

DESCRIPTION OF THE PRESENT INVENTION AND PREFERRED EMBODIMENTS

Some novel aspects of the present invention are discussed herein:

We employ, for the purpose of the present invention, the notion "environment-independent application Logic code" (AL code), for the code of an applications that is written in such a way that it runs unchanged in all the environments for which it is intended. In other words, there is only one single AL code that runs in all these environments (see FIG. 3). We employ the notion "environment" for the combination of hardware and software, in which the code of the application runs. An example of an environment is a stand-alone computer and its operating system. Having only one single AL code that runs in all environments is a characteristic property of the method of the present invention. The AL code it is not fitted to any particular environment. The AL code interacts with all the different environments using the same single abstract-semantic-interface, which we call the "interaction style interface" (IS interface). The IS interface is abstract in the sense that it does not specify any of the physical or geometrical properties of the environment. As an example of an IS interface, we consider the one employed in our WebSi (Web Simple Interfacing) system. In this system, the AL code may, for example, invoke the "Select.one" method of the IS interface. This method enables the user to select a single value out of a predefined set of values. This abstract specification of a selection does not specify how the selection is performed. It may, in one environment, be implemented as a selection of one of a number of radio buttons and in another environment by a selection in a space-saving drop-down menu.

Figure 3:
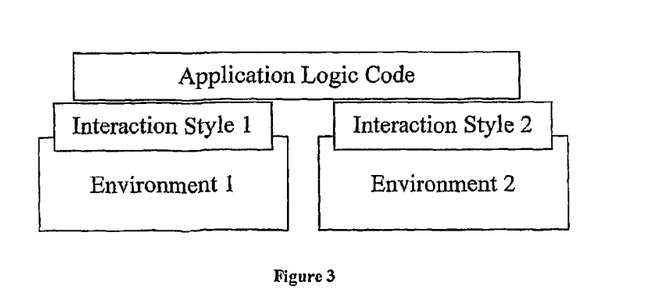
FIG. 3 illustrates the approach to developing environment independent software in accordance with a preferred embodiment of the present invention.

A code which we call the "Interaction Style code" (IS code) implements the interactions between the AL and the environment (see FIG. 3). It interacts with the AL code through the abstract IS interface discussed above. The IS code interacts with an environment using the interfaces of that environment. It may interface directly with a hardware component, or communicate indirectly with that hardware component using software such as the operating system or hardware drivers. Consider, for example, a PC managed by the Windows operating system. The IS code may in this case interact with the environment by invoking the API's of the Windows operating system. The IS code will in this example translate the abstract requests of the AL code to corresponding invocations of the Windows API's. An IS code is designed for a specific environment, such as Windows in the above example. It is possible to develop a number of different IS codes for the same environment. One IS may, for example, be designed to produce a command-line UI, suitable for experienced users, while another IS for the same environment may produce an easy-to-learn GUI. The IS code may be considered as a software layer providing the environment with the abstract IS interface, such that it may interact with one or more AL codes. A characteristic property of our invention is the environment-related IS code that implements the interactions between the AL codes and the environment.

Figure 12:
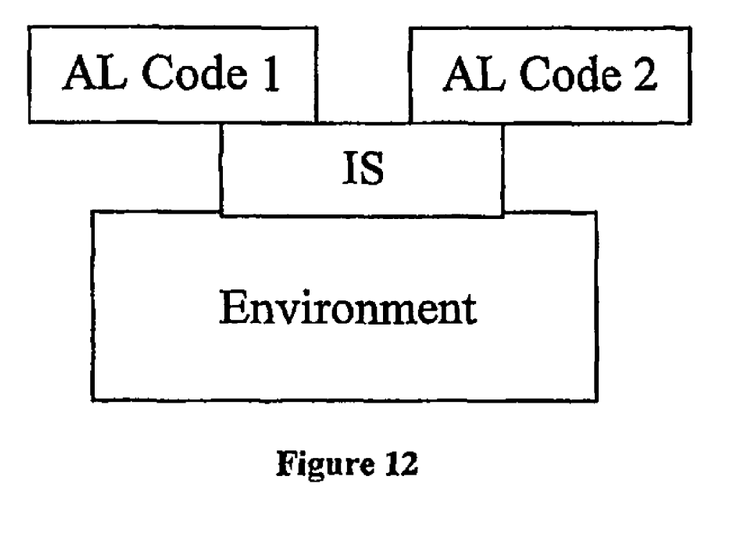
FIG. 12 illustrates reusing an interaction style code for different application codes.

Within a particular application domain, e.g., Web-based information systems, all the AL's and IS's that have to work together should employ the same single abstract IS interface. This will enable any one of these AL codes to interface with any one of these IS codes. An AL may, therefore, run on any environment, for which an appropriate IS exists. This same AL code will run in all environments without any change. There will, in other words, only be one single AL code that runs in all these environments (see FIG. 3). An IS for a particular environment may be reused by different AL's that have to run on that environment (see FIG. 12). Using a single abstract IS interface for all AL codes and IS codes that have to work together is a characteristic property of our method. The ability to reuse the same IS code for a number of different AL codes of the same application domain is also a characteristic property of the method of the present invention.

Using a single IS code for an AL code will give it a uniform user interaction style. There may, however, be situations, in which it is required to employ different interaction styles in different parts of the AL, i.e., using different IS codes for different parts of the AL. The use of a single IS for an entire application or for a part of an application, is a characteristic of the method of the present invention.

As opposed to previous methods, our method employs the same single AL code in all the environments. This may reduce system development costs considerably. Any application code corrections and code extensions to be done at a later stage, are done only once in this single AL code. This may considerably reduce the maintenance costs of the application.

A single IS code designed for a particular environment may be reused by many different AL codes running on that environment. This contrasts to previous methods, in which the adaptation to a new environment is done anew for each one of the different applications. The possible reuse of the IS code for many different AL codes may save costs, when compared to other methods. A further advantage is that the application development time may also be reduced by having a repository of ready made IS codes.

Figure 11:
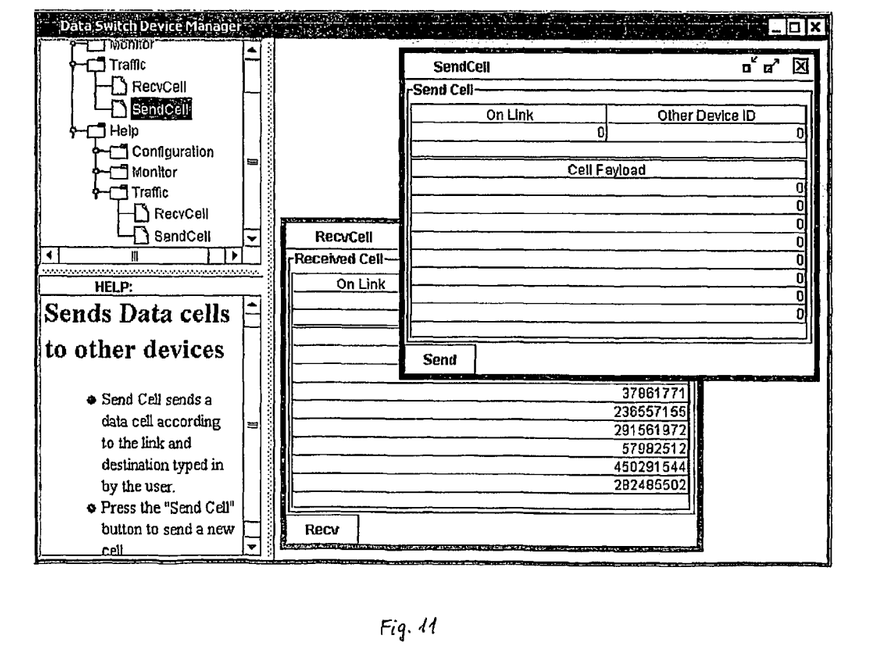
FIG. 11 illustrates Data Switch Device Manager—the GUI of an application operating a hardware device in accordance to a preferred embodiment of the present invention.

The method of the present invention can be employed for different kinds of interactions between an application and the environment in which it operates. We have employed the method of the invention both for the interactions that are common in WEB information systems. We have also employed our method for the interactions that are needed in an application that operates a hardware device called "Data Switch Device Manager". FIG. 11 shows the GUI of this application when the user operates the "Send Cell" operation. The tree in the upper left pane has the corresponding "Send Cell" node selected. The online help information for this operation is presented in the bottom left pane. The operation enables the user to send a packet from this data switch device to another data switch in the network. The user specifies on which link and to which device a packet will be sent. Then the user specifies the content of the packet and approves by pressing the 'Send' button. The GUI of the "Receive Cell" operation is also open. The kinds of interactions, employed in information systems and in hardware switches are quite different. The employment of our method in these two different cases demonstrates the applicability of our invention in different application domains. This contrasts to systems, such as that of J. Grundy et al, which is limited to the construction of UI's for Web-based devices. There are further cases, in which the facilities of Java-like languages are still insufficient. Consider, for example, an application that reads the outdoor temperature from a sensor or an application that outputs commands to a robot. These two kinds of I/O activities are not supported by the standard library of Java. Special software must, therefore, be written to operate the drivers of the temperature-measuring sensor and of the robot. These drivers and the associated software are usually different in the different target environments. Our technology can be employed in these cases. We can include the driver of the temperature-measuring sensor in the corresponding IS code, such that the AL can read the temperature through the abstract IS interface. Similarly, can the robot driver be included in an IS code enabling the AL's to issue instructions to a connected robot using abstract IS interface commands. The IS codes developed for different environments will employ the drivers that correspond to these domains. The AL code will run unchanged in the different environments as it interacts with the IS codes through the same abstract IS interface.

Figure 4:
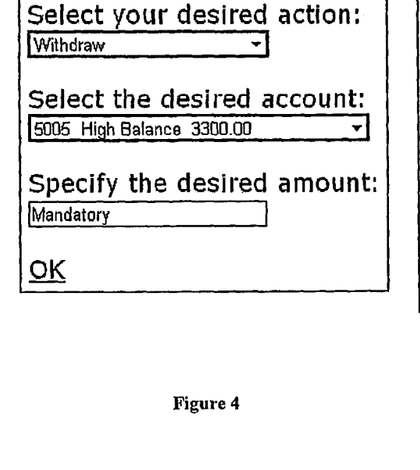
FIG. 4 illustrates a GUI for performing an operation on a bank account, using a space saving simple interface according to a preferred embodiment of the present invention.
Figure 5:
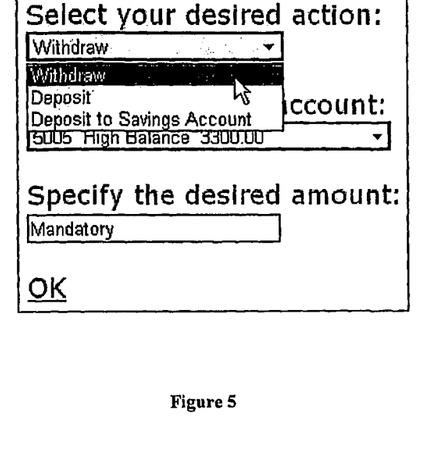
FIG. 5 illustrates selection of a desired operation on the GUI shown in FIG. 4.
Figure 6:
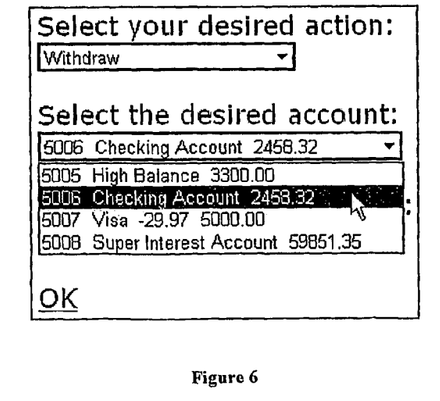
FIG. 6 illustrates selection of a particular bank account on the GUI shown in FIG. 4.
Figure 7:
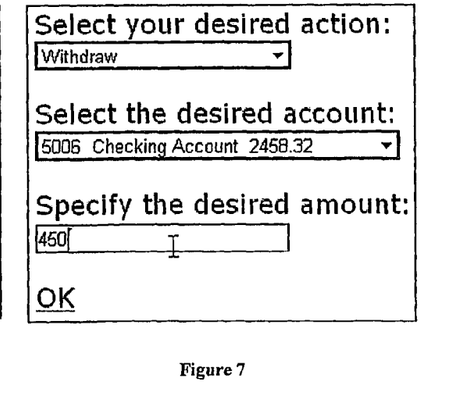
FIG. 7 illustrates specifying the desired amount on the GUI shown in FIG. 4.
Figure 8:
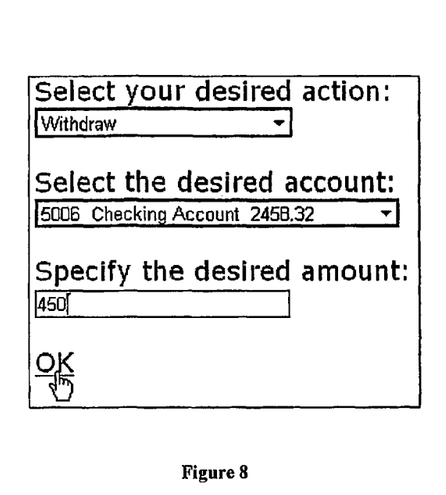
FIG. 8 illustrates confirming the withdrawal amount on the GUI shown in FIG. 4.
Figure 9:
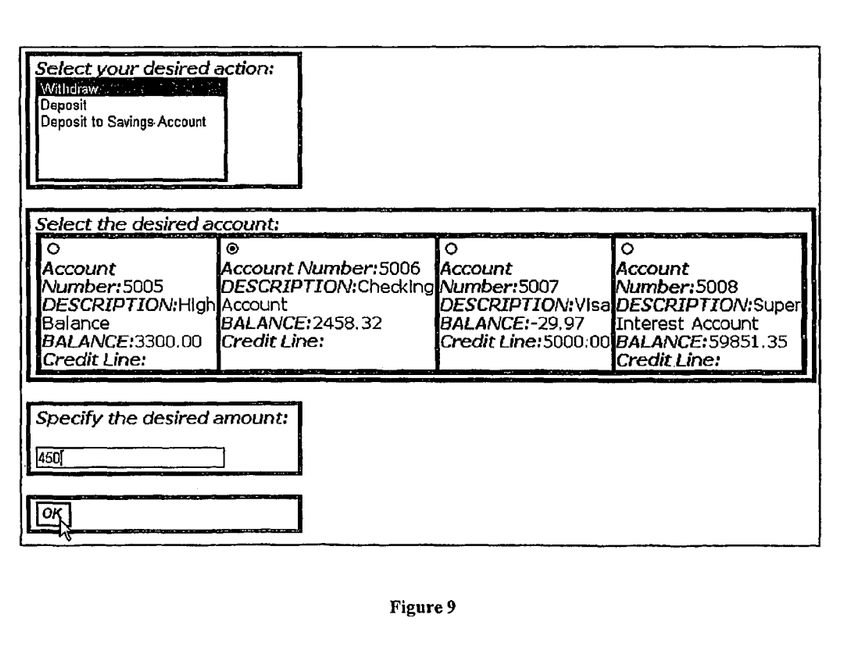
FIG. 9 illustrates an alternative GUI for that shown in FIG. 4 which was obtained with an alternative IS code.
Figure 10:
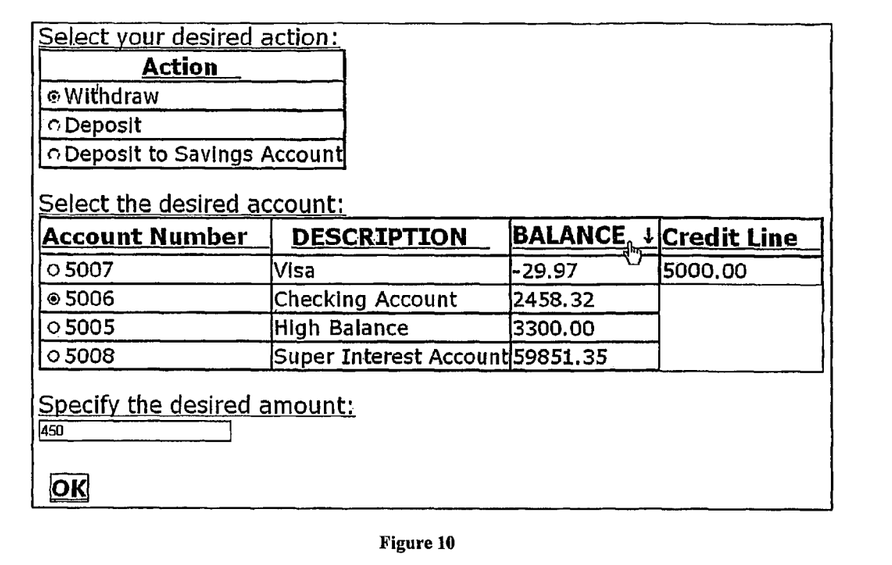
FIG. 10 illustrates yet another alternative GUI for managing a bank account.

There is a further class of problems that stems from differences in the hardware of the different environments, and not from insufficiencies of a standard library of the employed programming language. Consider, for example, an application that has to run on both a PC and a PDA (Personal Digital Assistant). The GUI problems of such small devices are discussed in (Jones, M., Buchanan, G., Thimbleby, H.:Improving web search on small screen devices. Interacting with Computers, 15 (2003) 479-495). On the large monitor of the PC it may be practical and useful to have a number of radio buttons enabling the user to select one of several options. On a small crowded PDA screen it may be necessary to employ a space-saving drop-down menu, instead of the space-consuming set of radio buttons. This difference between the two environments is illustrated in the example in the next section. In this example, three GUI's of the same application are shown. These GUI's employ different controls to implement the single-selection functionality. The GUI on FIG. 4 is more suitable for a PDA, while the GUI's on FIGS. 9 and 10 are suitable for a PC. The GUI code required for the different GUI controls is different. Three different code versions must, therefore, be written for this example. All these versions may be coded with the facilities of Hyper-Text Markup Language (HTML). The problem illustrated by this example is, thus, not the insufficiencies of the programming language, but rather the difference in presentational facilities of different environments. The solutions shown in FIGS. 4, 9 and 10 were produced by our method sing three different IS codes for the same single AL code and the same single IS interface. Such a UI's that can be adapted to the different capabilities of different environments while preserving usability, are sometimes called plastic user interfaces (Calvary, G., Coutaz, J., Thevenin, D., Limbourg, Q., Bouillon, L., Vanderdonckt, J.: A unifying reference framework for multi-target user interfaces. Journal of Interacting With Computers, Elsevier, June 2003, Vol 15/3, pp. 289-308).

In the following we use the term input for the moving of data from an environment to the AL code. One example of input is the data entered by the user via a keyboard (which is a part of the environment) and stored in some variables of the AL code. Another example of input is the moving of temperature data from a temperature sensor (which is a part of the environment) to be used in some calculations performed by the AL code. The term output is used for moving of data from the AL code to the environment. One example is presenting the results of AL code calculations on a screen. Another example is sending instructions computed by the AL code to a robot. The AL code implements the input and output activities by invoking appropriate method in the IS interface. An example of an IS interface is that employed in our WebSI system. Table 1 shows the classification of the I/O operations in WebSI. Table 2 shows some of the employed output methods, while Table 3 show some of the output methods employed in WebSI. Other implementations of our method may employs different methods. Our method may also work if the interactions are performed through message passing. Receiving and sending messages is in a way similar to data I/O. The employed message passing techniques, will be implemented in an appropriate IS code.

Let us consider, as an example, the case where the application requests some data from a human user. The AL code issues for this purpose an abstract request for user input. The IS o our WebSI system constructs a UI for this input request and manages the interaction with the user. The decisions on which UI controls to employ for the input, their sizes, colors, screen locations and so on are all done by the code of the IS. The IS employs the facilities of the environment for implementing the UI and managing the user interactions. The controls and algorithms employed for the construction of the UI are specific for the employed IS. If the developer of an application is unhappy with appearance of the UI produced by the IS, she may exchange it with another IS that employs different UI controls, sizes, colors, layout algorithms and so on. Exchanging one IS with a more appropriate IS is quite easy, because all the IS's employ the same single IS interface.

Our method may be implemented with different kinds of programming technologies. For example, an IS developed for stand-alone systems running on a PC may employ the services of Java Swing GUI packages in order to construct a GUI. An IS for multi-user Web applications will typically produce an HTML-based GUI. Such an IS may be implemented on top of a certain Web programming technology layer, such as PHP, ASP or J2EE. An IS developed for a certain environment is expected to usefully exploit the presentational facilities of this environment. For instance, an IS designed for a PC may employ large legible UI controls, while an IS for a PDA may use small UI controls that fit in the small screen of a PDA. An example of an IS fitted to a PC and the one more suitable for a PDA is discussed later in this section.

The invocations of the IS interface must be designed for pure semantic usage, i.e., the invocation arguments specify only the data involved. The arguments should not specify anything about the employed interaction techniques. If, for example, the I/O activities are accomplished through a GUI, the arguments should not specify the GUI controls to be employed, their size, shape, location, colors, fonts, graphics and so on. The principal property of such a semantic IS interface is that changes in the UI appearance can only be achieved by exchanging the IS and without making any changes in the AL code. This property of the AL code may be called UI independence, which is a special case of environment independence.

We shall now explain by an example how our IS architecture alleviates some of the difficulties in developing and maintaining multi-environment software. The example employs the methods of our WebSI framework, for which the AL code is written in Java. The example considers a use case in a small banking application. The use case enables the user to perform an operation on one of her bank accounts. The possible operations are: deposit money to the account, withdraw money from the account or make a deposit to the savings account. FIG. 4 depicts the UI, which has been generated automatically by WebSI from the AL code on FIG. 1. FIGS. 5, 6, 7 and 8 show how the user operates the application. First she selects the desired operation and the account. Then she specifies the amount of money to be withdrawn or deposited. Finally she confirms the transaction.

Figure 1:
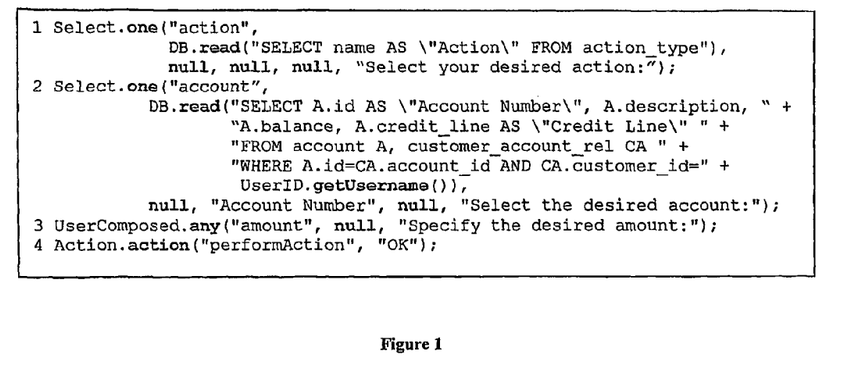
FIG. 1 illustrates a sample of a WebSI (web simple interface) based code, according to a preferred embodiment of the present invention.

The UI on FIGS. 4 to 8 has been specified with the help of semantic WebSI input methods, in the AL code shown on FIG. 1. Let us explain this code briefly. In line 1 the user is requested to select one of the three operations: withdraw, deposit or deposit to the savings account. For this purpose the programmer invokes the Select.one method of the WebSI IS interface. This method enables the user to select a single value out of a predefined values set. Then in line 2 the programmer requests the user to select a single account, out of the accounts owned by the user. Again, the programmer invokes the same Select.one method.

In line 3 the programmer requests the user to supply an amount, using the UserComposed any method, which enables the user to enter a user-composed value of any type. Finally, in line 4 the programmer enables the user to approve, by issuing the call to the Action.action method. By approving, the user will initiate an action, which will perform the desired operation on the selected account.

The IS demonstrated on FIGS. 4 to 8 is suitable for devices having a limited screen space, such as a PDA. This IS code implements the single-selection functionality using space-economic drop-down menus. In addition, the IS employs a text box for specifying the amount, and the "OK" hyperlink for approving the transaction.

A PC with a large monitor, however, has sufficient space for UI solutions employing large, legible controls, as shown on FIG. 9. Here, the IS employs a list box for selecting the operation name, which in our example is 'Withdraw'. For selecting the desired account, the IS uses a set of records.

Each record contains the account details and a radio button for selecting the account. An "OK" push button is employed for the action initiation.

An alternative IS suitable for a PC is presented on FIG. 10. Here the selections are indicated by clicking a radio button in an appropriate table row. In addition, the tables are sortable by any column, in ascending or descending order. Note, that the user has just sorted the accounts table according to account's balance in ascending order.

It is noted that all the UI's on FIGS. 4 to 10 have been produced from the same single AL code of FIG. 1, using different IS's.

Our method has been tested with the WebSI framework for development of Web-based interactive information systems.

The impressions of the users of WebSI. Is that it considerable reduced the application development effort. This was due partly to code reuse possibilities of the method. Further savings were obtained by programming the AL code with the simple abstract I/O commands avoiding the specification of environment details. Using the same IS in different applications also produced consistently structured GUI's.

TABLE 1

The WebSI I/O activities classification

| | Output |
|---|---|
| Input | Supplying user-composed values. The user may supply any value, rather than being restricted to a predefined values set. In some cases, the user is restricted to values of a certain type. Selecting values out of a predefined values set. The user is restricted to the predefined set and cannot supply values that are not in the set. Initiating actions in the system. |

TABLE 2

The WebSI output methods

| Method Name | Description |
|---|---|
| Output.scalar | Present a single value to the user |
| Output.table | Present a table to the user. The table is possibly a result of SQL SELECT query. |
| Output.error | Present a system error message to the user |

TABLE 3

The WebSI input methods

| Method description | Mandatory | Optional |
|---|---|---|
| Request a user-composed value of any type | UserComposed.any | UserComposed.anyOptional |
| Request an answer to a yes-no question | UserComposed.yesNo | UserComposed.yesNoOptional |
| Request a user-composed time value | UserComposed.time | UserComposed.timeOptional |
| Request a user-composed date value | UserComposed.date | UserComposed.dateOptional |
| Request the user to select a single row out of a table. The table is possibly a result of SQL SELECT query. | Select.one | Select.oneOptional |
| Request the user to select one or more rows out of a table. The table is possibly a result of SQL SELECT query. | Select.oneOrMore | Select.oneOrMoreOptional |
| Request the user to select a single cell in a table. Selecting a cell initiates an action in the system. The table is possibly a result of SQL SELECT query | Select.action | |
| Enable the user to initiate an action in the system | Action.action | |

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following Claims.

We claim:

1. A method that is executable by a processor for communicating between (i) at least one environment-independent application logic code (AL code) and (ii) at least one environment, which is a combination of hardware and software, the method comprising:

creating at least one interaction style code (IS code) that is specific to and communicates with said at least one environment, the interaction style code being provided with an interaction style interface (IS interface) for interfacing an interaction style with said at least one application logic code (AL code);

wherein said interaction style interface (IS interface) is independent of and does not specify properties of said at least one environment;

wherein said at least one environment-independent application logic code (AL code) runs unchanged in all environments; and wherein said at least one interaction style code (IS code) is operable with all of a graphical user interface, a non-graphical user interface, an HTML-based web browser user interface, and no user interface.

2. The method as claimed in claim 1, wherein the hardware in said at least one environment comprises a user interface device.

3. The method as claimed in claim 2, wherein the user interface device comprises a keyboard and a monitor.

4. The method as claimed in claim 1, wherein the hardware in said at least one environment comprises a sensor.

5. The method as claimed in claim 1, wherein the hardware in said at least one environment comprises a robotic device.

6. The method as claimed in claim 1, wherein the hardware in said at least one environment comprises a personal digital assistant (PDA) device.

7. The method as claimed in claim 1, wherein the hardware in said at least one environment comprises a personal computer (PC) device.

8. The method as claimed in claim 1, wherein the properties of said at least one environment comprise physical properties.

9. The method as claimed in claim 1, wherein the properties of said at least one environment comprise graphical properties.

10. The method as claimed in claim 1, wherein the interaction style interface specifies input and output data.

11. The method as claimed in claim 1, wherein the interaction style interface specifies input and output messages.

12. The method as claimed in claim 1, wherein the interaction style code interfaces with the hardware in said at least one environment.

13. A non-transitory computer-readable recording medium having a software architecture stored thereon for communicating between (i) at least one environment-independent application logic code (AL code) and (ii) at least one environment, which is a combination of hardware and software, the architecture comprising:

at least one interaction style code (IS code) that is specific to and interfaces with said at least one environment, the interaction style code being provided with an interaction style interface (IS interface) for interfacing an interaction style with said at least one application logic code (AL code);

wherein said interaction style interface (IS interface) is independent of and does not specify properties of said at least one environment;

wherein said at least one environment-independent application logic code (AL code) runs unchanged in all environments; and wherein said at least one interaction style code (IS code) is operable with all of a graphical user interface, a non-graphical user interface, an HTML-based web browser user interface, and no user interface.

14. The non-transitory computer-readable recording medium as claimed in claim 13, wherein the properties of said at least one environment comprise physical properties.

15. The non-transitory computer-readable recording medium as claimed in claim 13, wherein the properties of said at least one environment comprise graphical properties.

* * * * *